(12) United States Patent
Meyer

(10) Patent No.: US 10,393,491 B2
(45) Date of Patent: Aug. 27, 2019

(54) LENGTH-MEASURING DEVICE

(71) Applicant: DR. JOHANNES HEIDENHAIN GmbH, Traunreut (DE)

(72) Inventor: Hermann Meyer, Schneizlreuth (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 225 days.

(21) Appl. No.: 15/641,361

(22) Filed: Jul. 5, 2017

(65) Prior Publication Data

US 2018/0038677 A1 Feb. 8, 2018

(30) Foreign Application Priority Data

Aug. 2, 2016 (EP) ..................................... 16182284

(51) Int. Cl.
| | | |
|---|---|---|
| *G01B 5/14* | (2006.01) | |
| *G01B 5/00* | (2006.01) | |
| *G01B 21/16* | (2006.01) | |
| *G01B 5/02* | (2006.01) | |
| *G01D 5/347* | (2006.01) | |

(52) U.S. Cl.
CPC ......... *G01B 5/0014* (2013.01); *G01B 5/0004* (2013.01); *G01B 5/02* (2013.01); *G01B 5/14* (2013.01); *G01B 21/16* (2013.01); *G01D 5/34707* (2013.01); *G01D 5/34746* (2013.01)

(58) Field of Classification Search
CPC ........ G01B 5/0014; G01B 5/14; G01B 21/16; G01B 7/14; G01B 11/14
USPC .................................................. 33/706–708
See application file for complete search history.

(56) References Cited

U.S. PATENT DOCUMENTS

| | | | | | |
|---|---|---|---|---|---|
| 3,522,568 | A | * | 8/1970 | Hasbrouck ............. | G01B 3/004 336/115 |
| 4,160,328 | A | * | 7/1979 | Ernst ...................... | G01D 5/347 33/705 |
| 4,170,826 | A | * | 10/1979 | Holstein ............ | G01D 5/34761 33/702 |
| 4,534,113 | A | * | 8/1985 | Holstein .............. | G01B 5/0014 33/707 |

(Continued)

FOREIGN PATENT DOCUMENTS

| | | | | |
|---|---|---|---|---|
| EP | 0163857 A2 | * | 12/1985 | ........... G01B 5/0014 |
| EP | 0169189 A2 | | 1/1986 | |

(Continued)

*Primary Examiner* — Christopher W Fulton
(74) *Attorney, Agent, or Firm* — Leydig, Voit & Mayer, Ltd.

(57) ABSTRACT

A length-measuring device for measuring a relative position of two objects includes a hollow section member in which a tensioned scale tape extends. A mounting block is disposed at each end of the scale tape. An adjuster is configured to position a mounting block on the hollow section member in a first installed condition such that the mounting block is displaceable in the longitudinal direction. The adjuster is movably mounted on the hollow section member and capable of being brought from a first to a second position. The mounting block is in the first installed condition when the adjuster is in the first position. The mounting block is movable to a second installed condition by moving the adjuster to the second position. In the second installed condition, the mounting block is fixed in a nominal position defined by the adjuster on the hollow section member.

10 Claims, 5 Drawing Sheets

(56) References Cited

U.S. PATENT DOCUMENTS

| | | | | |
|---|---|---|---|---|
| 4,554,741 A | * | 11/1985 | Affa | G01B 21/02 |
| | | | | 250/237 G |
| 4,584,773 A | | 4/1986 | Rieder et al. | |
| 4,759,132 A | | 7/1988 | Giacomello | |
| 4,776,098 A | * | 10/1988 | Nelle | G01B 5/0014 |
| | | | | 33/702 |
| 4,912,856 A | * | 4/1990 | Ernst | G01B 5/0014 |
| | | | | 33/702 |
| 5,142,792 A | * | 9/1992 | Nelle | G01D 5/34753 |
| | | | | 33/702 |
| 5,511,321 A | * | 4/1996 | Nelle | G01B 5/0014 |
| | | | | 33/702 |
| 5,551,163 A | * | 9/1996 | Affa | G01D 5/34761 |
| | | | | 33/702 |
| 5,832,616 A | * | 11/1998 | Fiedler | G01D 5/34707 |
| | | | | 33/706 |
| 6,415,524 B1 | * | 7/2002 | Muller | G01D 5/34746 |
| | | | | 33/706 |
| 2009/0071025 A1 | * | 3/2009 | Affa | G01D 5/34753 |
| | | | | 33/706 |

FOREIGN PATENT DOCUMENTS

| | | | | |
|---|---|---|---|---|
| EP | 0247353 A1 | | 12/1987 | |
| EP | 0566828 A2 | * | 10/1993 | G01B 5/0014 |
| EP | 2325610 A1 | | 5/2011 | |
| EP | 3279615 A1 | * | 2/2018 | G01B 5/0004 |
| ES | 2110902 A1 | | 2/1998 | |

\* cited by examiner

LENGTH-MEASURING DEVICE

CROSS-REFERENCE TO PRIOR APPLICATION

Priority is claimed to European Patent Application No. EP 16182284.6, filed on Aug. 2, 2016, the entire disclosure of which is hereby incorporated by reference herein.

FIELD

The present invention relates to a length-measuring device for measuring the relative position of two objects, the length-measuring device comprising a hollow section member in which a scale tape extends, in a tensioned state, in the longitudinal direction.

BACKGROUND

ES 2 110 902 A1 describes a length-measuring device of the above-mentioned type. The length-measuring device includes a hollow section member in which a scale tape extends, in a tensioned state, in the longitudinal direction. A mounting block is provided at each end of the scale tape, the scale tape being attached to each of the mounting blocks. The two mounting blocks are each positioned on the hollow section member by screws in such a way that the mounting blocks can be displaced relative to the hollow section. For purposes of position measurement, the scale tape is connected directly to a machine part by screwing the mounting blocks thereto, and thus temperature-induced changes in the length of the machine part are transferred to the scale tape. Since the mounting blocks are disposed on the hollow section member such that they are decoupled therefrom in the longitudinal direction, the hollow section member can thermally expand independently of the scale tape and, therefore, does not negatively affect the measuring accuracy of the length-measuring device.

SUMMARY

In an embodiment, the present invention provides a length-measuring device for measuring a relative position of two objects with respect to each other. The length-measuring device includes a hollow section member in which a scale tape extends, in a tensioned state, in a longitudinal direction. A mounting block is disposed at each end of the scale tape, the scale tape being attached to each of the mounting blocks. An adjuster is configured to position at least a first one of the mounting blocks on the hollow section member in a first installed condition such that the first one of the mounting blocks is displaceable in the longitudinal direction. The adjuster is movably mounted on the hollow section member and capable of being brought from a first position to a second position. The first one of the mounting blocks is in the first installed condition in a state in which the adjuster is in the first position. The first one of the mounting blocks is movable to a second installed condition by moving the adjuster to the second position. In the second installed condition, the first one of the mounting blocks is fixed in a nominal position defined by the adjuster on the hollow section member.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
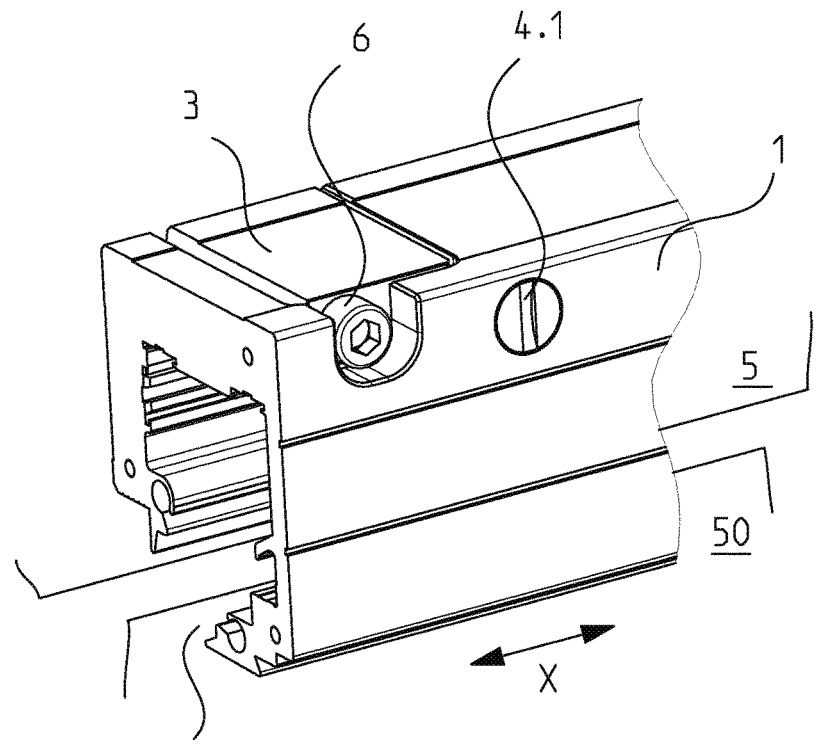
FIG. 1 is a perspective view of the mounted length-measuring device according to the first exemplary embodiment.

The inventor has recognized that the design of ES 2 110 902 A1 has the disadvantage that in the delivery condition, prior to attachment to the machine part, the position of the mounting blocks relative to the hollow section member is undefined.

In an embodiment, the present invention provides a length-measuring device that provides improved handling and permits improved position measurement.

According to an embodiment, the present invention provides an improvement over the prior art by an improvement in the positioning of a mounting block with respect to the hollow section member.

Specifically, an embodiment of the present invention relates to a length-measuring device for measuring the relative position of two objects, the length-measuring device including a hollow section member in which a scale tape extends in the longitudinal direction in a state in which it is tensioned to the desired length. A mounting block is provided at each end of the scale tape, the scale tape being attached to each of the mounting blocks. The two mounting blocks at the ends are configured for direct attachment to a machine part, so that the scale tape can be attached in the tensioned state to the machine part via the mounting blocks.

The length-measuring device further includes an adjustment means for positioning at least one of the mounting blocks on the hollow section member in a first installed condition such that it is displaceable in the longitudinal direction. The adjustment means is movable on the hollow section member and capable of being brought from a first position to a second position. By the first position of the adjustment means, it is achieved that the mounting block is in the first installed condition, in which it is supported on the hollow section member in such a manner that it is displaceable in the longitudinal direction. By moving the adjustment means to the second position, the mounting block is movable to a defined nominal position relative to the hollow section member. In this connection, a surface of the adjustment means cooperates as an abutment surface with the mounting block. The nominal position is defined by the adjustment means.

The adjustment means is configured to enable the mounting block to be displaced to the nominal position. This displacement may be achieved by a ramp of the adjustment means. The displacement of the mounting block may be accomplished by turning the adjustment means about an axis of rotation or through displacement along an axis. In this connection, the ramp forms the abutment surface which interacts with the mounting block. Alternatively, a pivotable lever may be provided for moving the mounting block from the first installed position to a second installed position.

In the first installed condition, the displaceable mounting of the mounting block relative to the hollow section member should provide at least for a displacement distance which is derived from the difference of the thermally induced change in the length of the machine part with respect to the hollow section member. Beyond this displacement distance, the displaceability may be limited by stops.

An embodiment of the present invention now makes it possible to retain a mounting block in a defined nominal position relative to the hollow section member, so that the mounting block can be mounted to a machine part in a defined position. In addition, an embodiment of the present invention allows this nominal position to be attained in an easy and reproducible manner, independently of the machine part.

The adjustment means is disposed on the hollow section member in both the first installed condition and in the second installed condition.

The present invention will now be described with reference to several exemplary embodiments, which differ only in the construction of the adjustment means.

Figure 2:
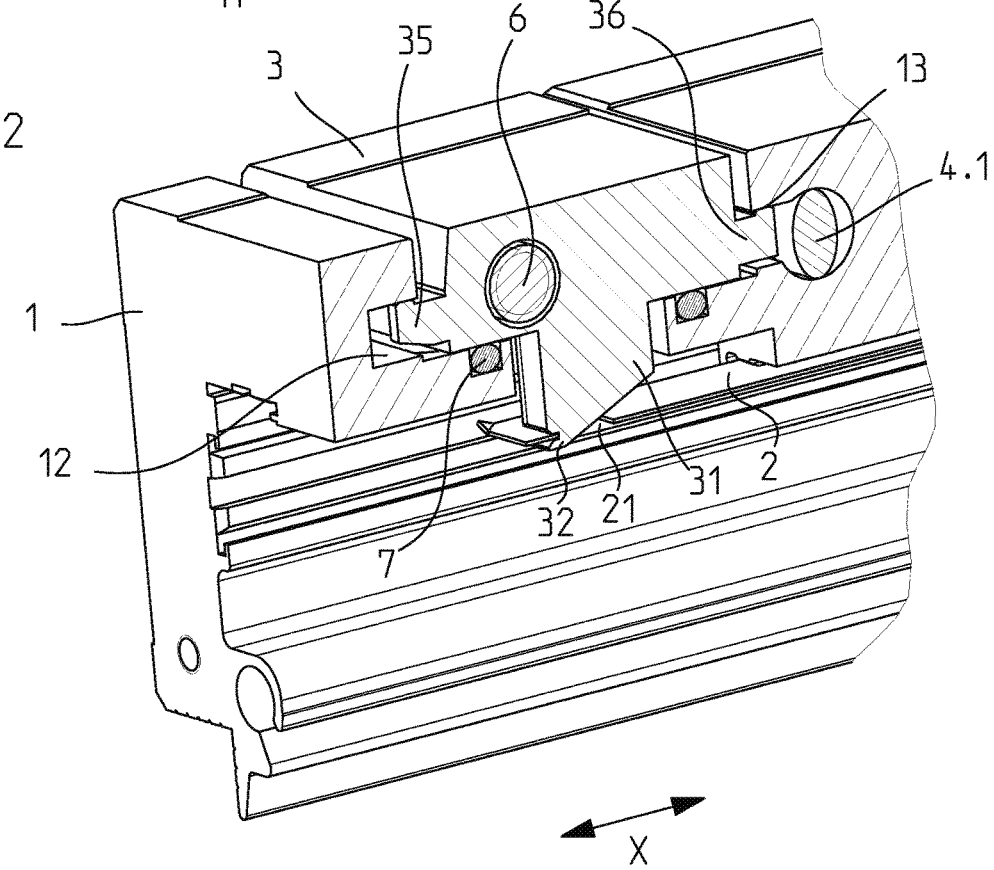
FIG. 2 is a cross-sectional view of the length-measuring device of FIG. 1.
Figure 3:
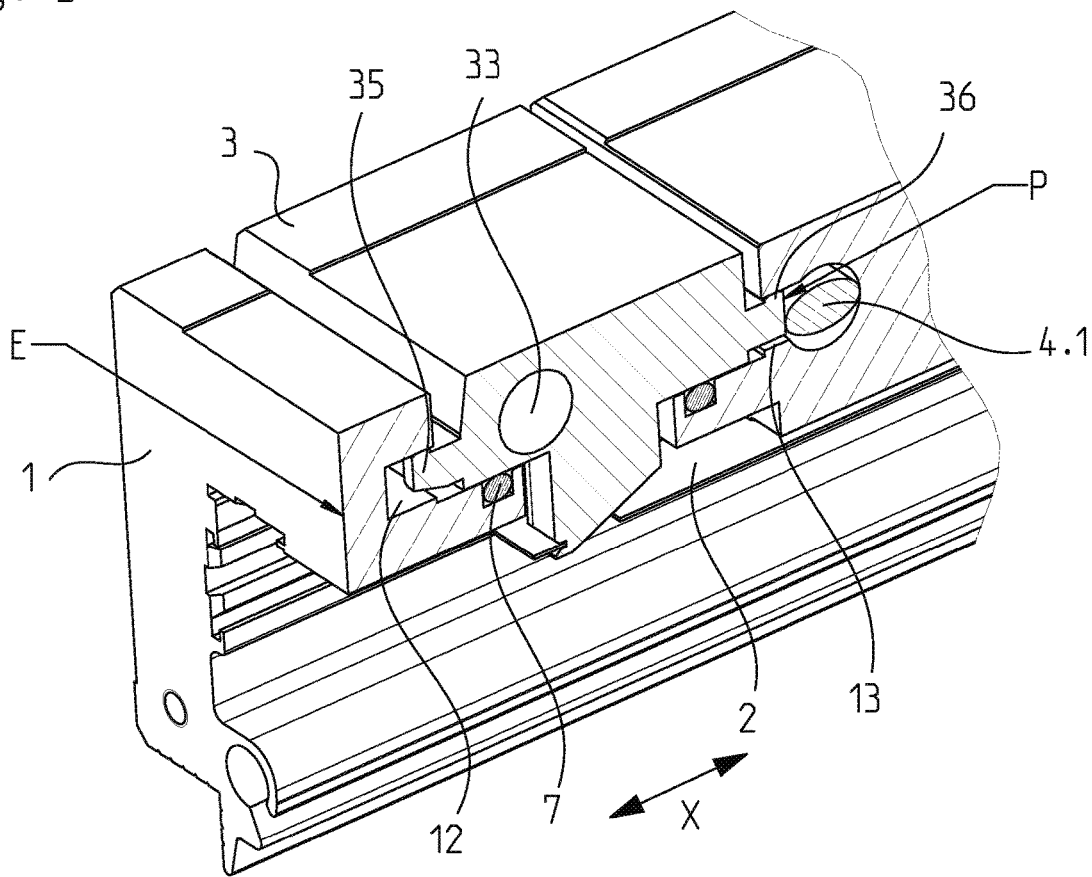
FIG. 3 is a cross-sectional view showing the length-measuring device in the unmounted state.
Figure 4:
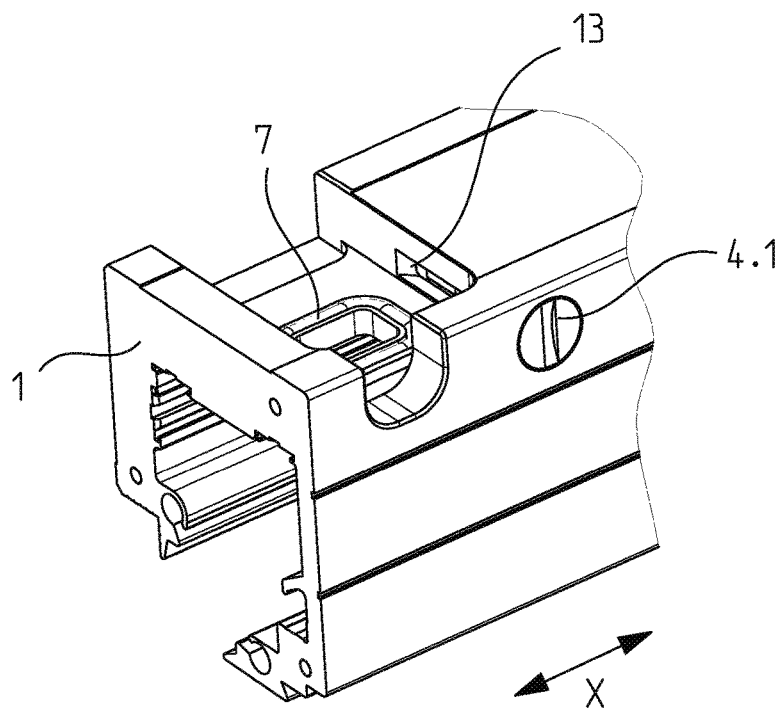
FIG. 4 is a perspective view showing the length-measuring device without mounting block.
Figure 5:
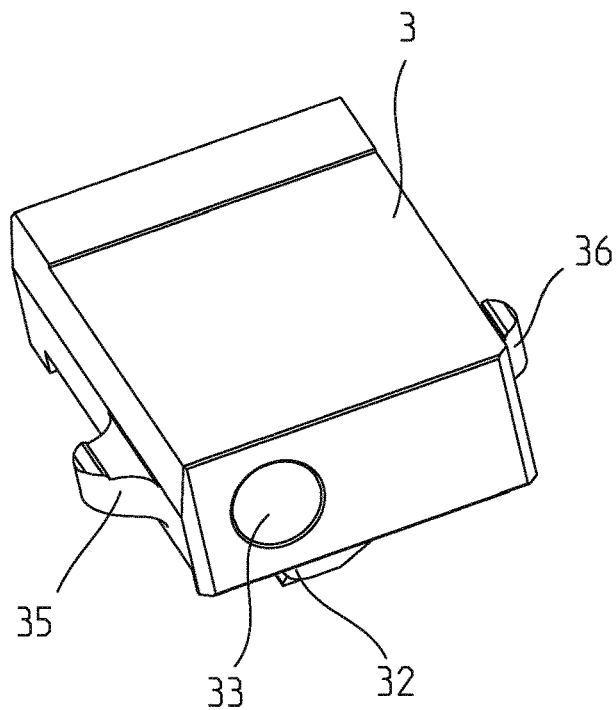
FIG. 5 is a perspective view of the mounting block.
Figure 6:
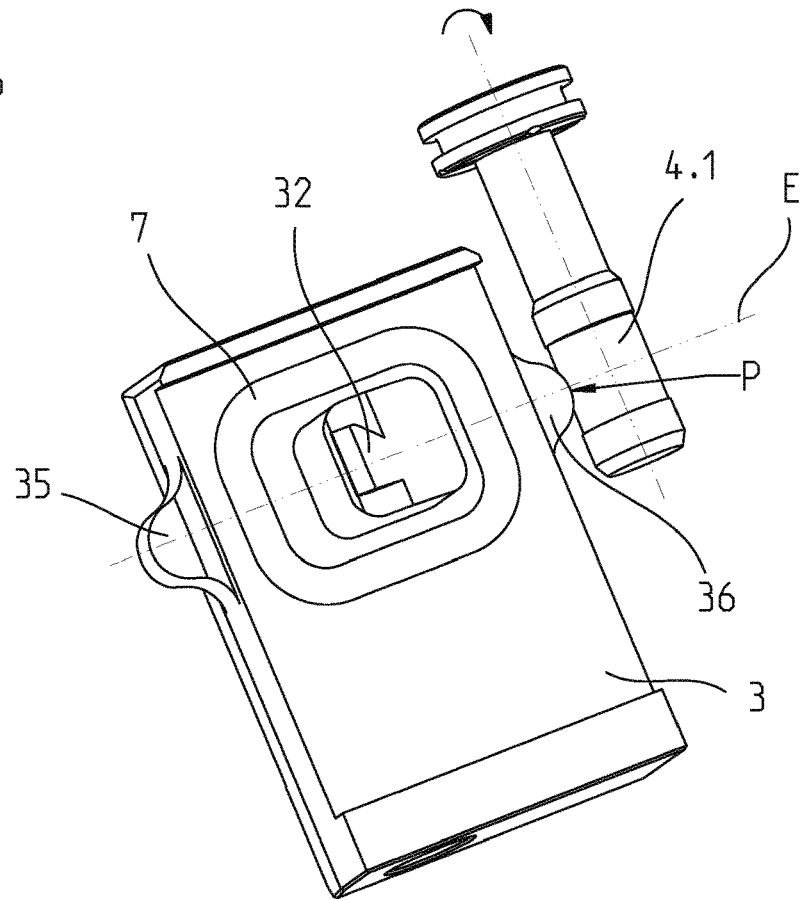
FIG. 6 is a perspective view showing the mounting block with an adjustment means according to the first exemplary embodiment.
Figure 7:
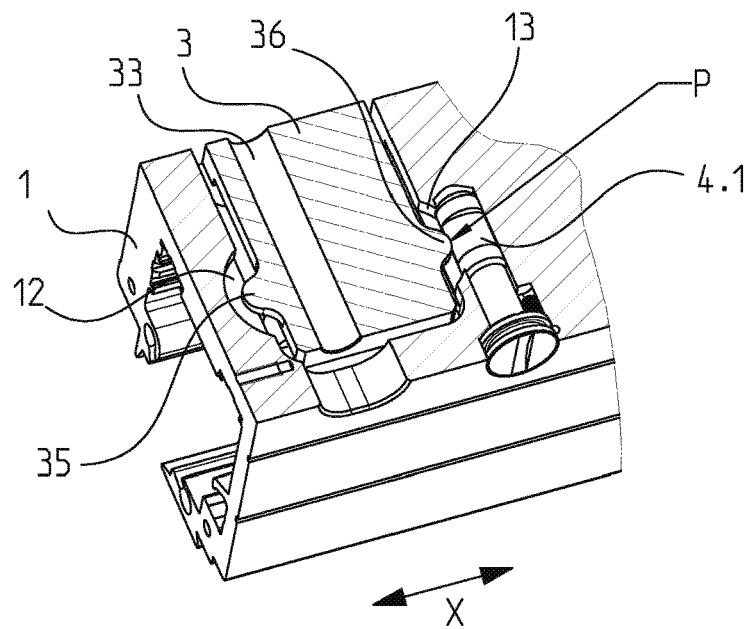
FIG. 7 is a cross section through the length-measuring device of FIG. 3 in the region of the mounting block.

The first exemplary embodiment of a length-measuring device configured in accordance with the present invention will be described with reference to FIGS. 1 through 7. FIGS. 1 and 2 show the length-measuring device in the first installed condition, and FIG. 3 shows it in the second installed condition.

This length-measuring device includes a hollow section member 1 having a longitudinal slot 11 which is sealed by sealing lips arranged in a roof-like manner. During position measurement, a scanning unit is disposed within hollow section member 1 and attached to an object 50 to be measured via a drive dog extending through the sealing lips and passing through the longitudinal slot 11. For purposes of position measurement, the drive dog of the scanning unit is mounted to a first object 50 to be measured, and hollow section member 1 is mounted to a second object to be measured, which is movable relative to the first object to be measured in longitudinal direction X and which is hereinafter referred to as machine part 5. Longitudinal direction X corresponds to the measurement direction.

In length-measuring devices, scale tapes 2 are used whose measuring graduation is deliberately manufactured with insufficient length so as to counteract thermally induced changes in length. To enable measurement operation, scale tapes 2 are stretched to their nominal length in longitudinal direction X. Hollow section member 1 has provided therein a groove in which scale tape 2 is received in such a manner that it is form-fittingly locked in directions transverse to longitudinal direction X, but decoupled from hollow section member 1 in longitudinal direction X such that it can expand independently of hollow section member 1. Scale tape 2 carries a measuring graduation on its upper side; i.e., the side located opposite the scanning unit and facing the same.

During measurement operation, the measuring graduation is scanned, preferably photoelectrically, by the scanning unit. In this process, the scanning unit generates position-dependent scanning signals. The measuring graduation may alternatively be designed to be scannable magnetically, inductively or capacitively, and may be an incremental or absolute measuring graduation.

For purposes of position measurement, scale tape 2 is maintained tensioned along and within hollow section member 1 by being fixed directly to machine part 5 via a mounting block 3 at each of its two ends. The present invention will be explained in more detail based on the left mounting block 3 of the illustrated length-measuring device. The mounting block at the other (here right) end of the length-measuring device may be configured in the same way as the mounting block 3 that will be described in greater detail below. Alternatively or additionally, a tensioning device may be provided at the other end (here the right end of the length-measuring device). Using this tensioning device, scale tape 2 can be brought to the desired tensioned condition. To this end, the tensioning device may have a spring whose tensioning force is adjustable. Such tensioning devices are well known to those skilled in the art and therefore do not require further explanation.

Scale tape 2 is attached to a pulling dog 31 of mounting block 3. Attachment may be accomplished by screws, but preferably by engaging a hook 32 of pulling dog 31 into an opening 21 of scale tape 2.

In accordance with the present invention, mounting block 3 may assume two different installed conditions relative to hollow section member 1. In the first installed condition, mounting block 3 is positioned on hollow section member 1 such that it is displaceable in longitudinal direction X. In this first installed condition, the length-measuring device is mounted to machine part 5 for purposes of position measurement by the two mounting blocks 3 at the ends being screwed to machine part 5 and maintaining scale tape 2 in the adjusted tensioned condition. To this end, mounting block 3 is provided with a bore 33 which extends in a direction transverse to longitudinal direction X and via which mounting block 3 is stationarily fixed to machine part 5 by a screw 6. This installed condition of the length-measuring device is shown in FIGS. 1 and 2.

It is particularly advantageous if scale tape 2 and mounting blocks 3 have the same thermal properties, and preferably they are composed of identical material, in particular of the same material as the machine part 5 to which mounting blocks 3 are mounted. In most cases, machine part 5 is made of steel. In these cases, mounting block 3 should also be made of steel, and scale tape 2 should be a steel tape.

Changes in the length of machine part 5 caused by temperature changes are transmitted directly to scale tape 2. Since mounting blocks 3 are decoupled from hollow section member 1 in longitudinal direction X, no constraining forces are transmitted to scale tape 2 from hollow section member 1, which is generally made of aluminum.

In the first installed condition, the displaceable mounting of mounting block 3 relative to hollow section member 1 should provide at least for a displacement distance which is derived from the difference of the thermally induced change in the length of machine part 5 with respect to the hollow section member 1. Beyond this displacement distance, the displaceability of mounting block 3 may be limited by stops.

In the second installed condition, mounting block 3 is retained in a nominal position relative to hollow section member 1. This second installed condition is the one in which the length-measuring device is delivered by the manufacturer and mounted to machine part 5 by the user. In this condition, scale tape 2 is in a tensioned condition that is optimized for accurate position measurement. This second installed condition is shown in FIG. 3.

In order to retain mounting block 3 in the nominal position, an adjustment means is provided which is movably mounted on hollow section member 1 and capable of being brought from a first position to a second position. In the first position of the adjustment means, mounting block 3 is in the first installed condition. By moving the adjustment means to the second position, mounting block 3 is moved to the nominal position and retained in this nominal position in longitudinal direction X relative to hollow section member 1. In this connection, a surface of the adjustment means cooperates as an abutment surface with mounting block 3. The nominal position is defined by the adjustment means.

In the first exemplary embodiment, the adjustment means is a body 4.1 which is rotatably mounted in the hollow section member and whose surface is configured such that mounting block 3 is positioned in the first installed condition when body 4.1 is in a first rotational position. In a second rotational position of body 4.1, mounting block 3 is positioned in the second installed condition by body 4.1 fixing it in the nominal position on hollow section member 1. The first rotational position of body 4.1 is shown in FIG. 2, and the second rotational position of body 4.1 is shown in FIG. 3. The surface of rotatably mounted body 4.1 forms the abutment surface which interacts with mounting block 3.

Rotatable body 4.1 has an eccentric surface with which mounting block 3 can be moved from the first installed condition to the second installed condition by turning body 4.1 about its longitudinal axis. Thus, the present invention enables mounting block 3 to be reproducibly and repeatedly positioned from the first installed condition into the second installed condition and reversely from the second installed condition back into the first installed condition. In the exemplary embodiment shown, in the second installed condition, a surface region of body 4.1 cooperates as an abutment surface with an abutment of mounting block 3. In this condition, the length-measuring device can be removed from machine part 5 without changing the adjusted tensioned condition of scale tape 2. Due to the tensioned scale tape 2, mounting block 3 is urged against body 4.1 and thus retained in the nominal position. In the second installed condition, body 4.1 contacts mounting block 3 at a position P which, together with the resulting force application point of scale tape 2 on mounting block 3, lies in a plane E oriented in longitudinal direction X. It is thereby achieved that the force introduced into mounting block 3 due to the tension of the scale tape is supported by body 4.1 in such a manner that no transverse forces or torques are exerted on mounting block 3. Preferably, plane E is defined perpendicularly and centrally to the surface of the scale tape.

By turning body 4.1 about its longitudinal axis, the surface region of body 4.1 can be rotated away from the abutment of mounting block 3, so that no surface of body 4.1 hinders the movability of mounting block 3 relative to hollow section member 1. The eccentric surface of body 4.1 ensures that mounting block 3 can be repeatedly and very precisely moved to the nominal position with an accuracy in the micron range.

The rotational position of body 4.1 shown in FIG. 3; i.e., the second installed condition of the length-measuring device, may be defined by a detent. For this purpose, body 4.1 may, for example, be formed with a groove in which a spring-biased ball engages when body 4.1 is in the rotational position in which mounting block 3 is in the nominal position on hollow section member 1. Alternatively, the rotational position may be provided by a rotation-limiting stop.

Mounting block 3 has guide surfaces which engage in undercuts 12, 13 of hollow section member 1, positioning mounting block 3 therein in such a manner that it is displaceable in longitudinal direction X. Undercuts 12, 13 are provided in hollow section member 1 in the form of guide grooves extending in longitudinal direction X.

The guide surfaces are formed on projections 35, 36 pointing in longitudinal direction X and spaced apart from each other in longitudinal direction X. Each of the two projections 35, 36 engages in one of the undercuts 12, 13 of hollow section member 1. Undercuts 12, 13 embrace projections 35, 36, securing mounting block 3 in a direction perpendicular to longitudinal direction X and perpendicular to the surface of the scale tape. Projections 35, 36 form a kind of guide pins, which are disposed in the guide grooves of hollow section member 1 and captively retain mounting block 3 therein and guide it in axial direction X.

The centroids of the guide surfaces on projections 35, 36 are preferably also located in plane E. This ensures that the force introduced into mounting block 3 due to the tension of the scale tape is received by the mating surfaces of hollow section member 1 opposite the guide surfaces of projections 35, 36 without any transverse forces or resulting torques being exerted perpendicularly to the plane of the scale tape. In this way, mounting block 3 is reliably prevented from rotating out of position and deteriorating the measurement accuracy. In FIG. 3, plane E is the plane of section.

Pulling dog 31 is located between projections 35, 36 of mounting block 3 (viewed in longitudinal direction X) and projects through an aperture into the interior of hollow section member. This aperture is sealed by an elastic seal 7 in the form of a sealing ring disposed between mounting block 3 and hollow section member 1. The sealing ring surrounds the aperture. Elastic seal 7 exerts a force on the mounting block, the force urging projections 35, 36, and thus the guide surfaces, against mating surfaces of undercuts 12, 13 of hollow section member 1.

It is particularly advantageous if the contact point P of the abutment surface of the adjustment means (here body 4.1) with mounting block 3, as well as the center of the profile of seal 7 and the resulting force application point of the attachment of scale tape 2 to pulling dog 31, as well as the centroids of the guide surfaces of mounting block 3 that are spaced part from each other in longitudinal direction X, are located in common plane E. This plane E is oriented in longitudinal direction X and is preferably also oriented perpendicularly and centrally to the surface of the scale tape.

Figure 8:
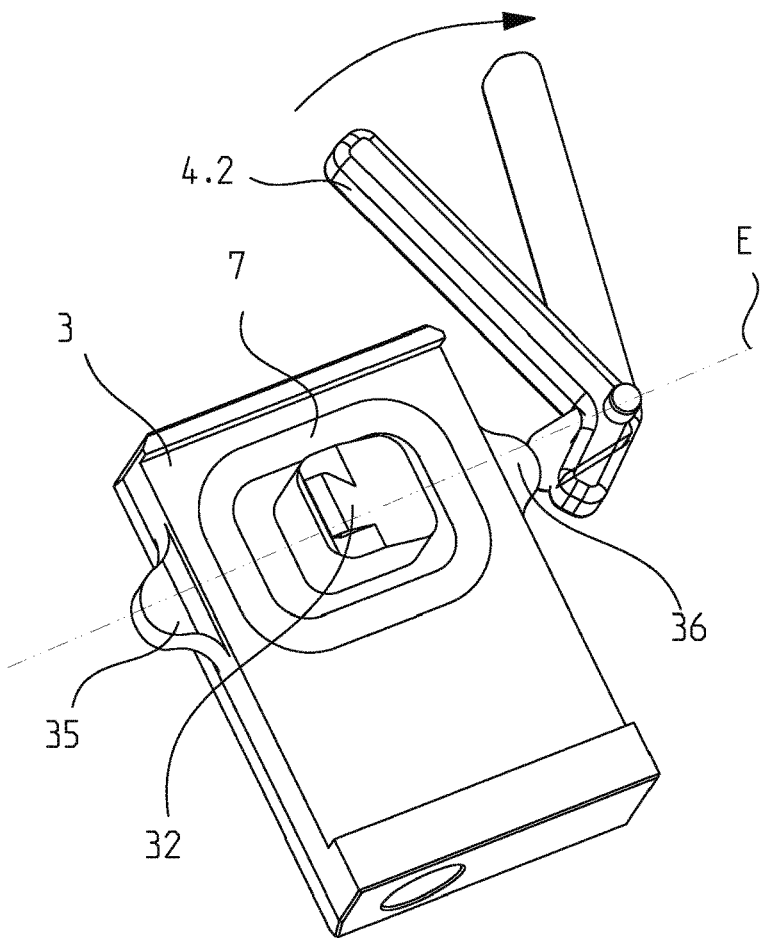
FIG. 8 is a view of a second exemplary embodiment of an adjustment means.

A second exemplary embodiment will now be described in more detail with reference to FIG. 8. In this case, the adjustment means is a lever 4.2 that is pivotable in hollow section member 1. By pivoting lever 4.2, an abutment or abutment surface of lever 4.2 can be brought into contact with an abutment of mounting block 3, and thus mounting block 3 can be moved to the second installed condition, in which the mounting block is fixed in the nominal position with respect to hollow section member 1.

The lever action of lever 4.2 ensures that mounting block 3 can be accurately moved into the nominal position.

Here too, the rotational position of lever 4.2 that defines the second installed condition of the length-measuring device may be defined by a detent, such as, for example, a groove formed on lever 4.2, in which a spring-biased ball engages when lever 4.2 is in the rotational position in which mounting block 3 is in the nominal position on hollow section member 1. The rotational position may alternatively be provided by a rotation-limiting stop.

Figure 9:
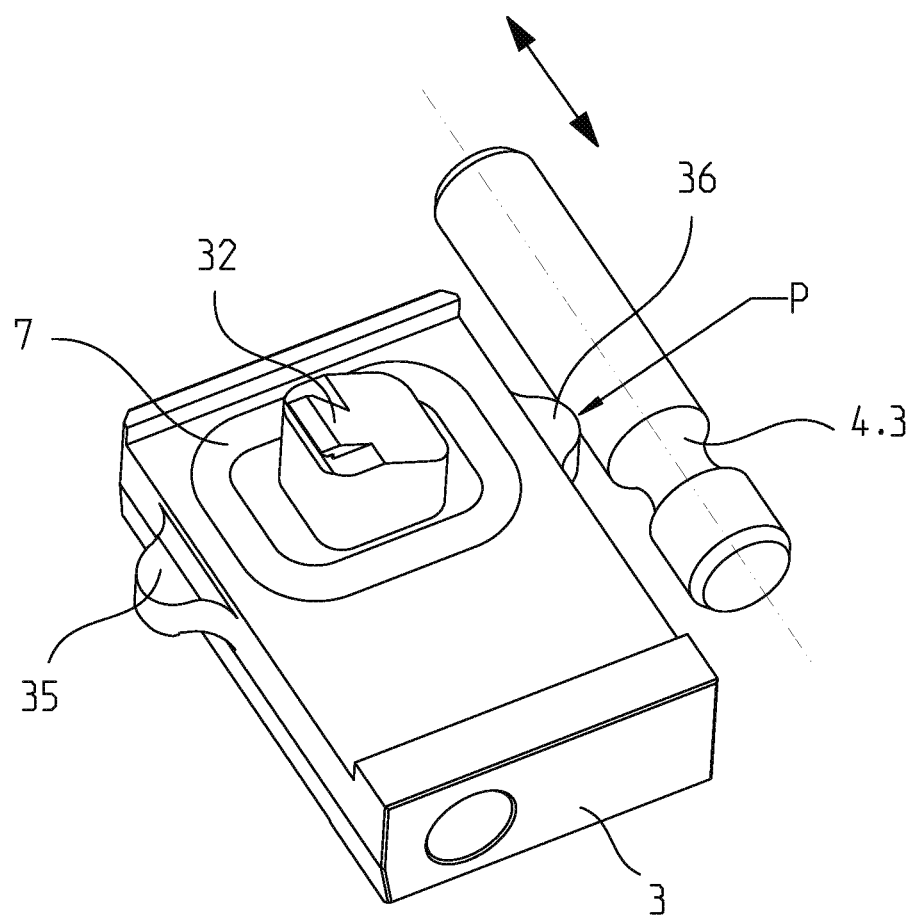
FIG. 9 is a view of a third exemplary embodiment of an adjustment means.

A third exemplary embodiment will now be described in more detail with reference to FIG. 9. In this case, the adjustment means is an element 4.3 which is displaceable within hollow section member 1 and formed with a ramp that is configured such that mounting block 3 is positioned in the first installed condition when this element 4.3 is in a first position and that mounting block 3 is positioned in the second installed condition when this element 4.3 is in a second position. In the second installed position, mounting block 3 is fixed in the nominal position by a surface of this element 4.3. The ramp ensures that mounting block 3 can be accurately moved into the nominal position. The ramp is a surface that is inclined to the direction of displacement of element 4.3, the ramp forming the abutment surface that cooperates with mounting block 3.

All embodiments of the present invention provide a simple way of moving mounting block 3 relative to hollow section member 1 to a defined nominal position and retaining it therein, so that mounting block 3 can be mounted to machine part 5 in a defined position. In addition, the present invention allows this nominal position to be attained in an easy and reproducible manner, independently of machine part 5. By moving the adjustment means 4.1, 4.2, 4.3 movably mounted in hollow section member 1, mounting block 3 can be reproducibly moved to the nominal position. Adjustment means 4.1, 4.2, 4.3 is disposed on hollow section member 1 both in the first installed condition and in the second installed condition.

The present invention may also be advantageously used in length-measuring devices where hollow section member 1 is composed of a plurality of sections abutting against one another. In this case, scale tape 2 is tensioned across this plurality of sections.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A length-measuring device for measuring a relative position of two objects with respect to each other, the length-measuring device comprising:
   a hollow section member in which a scale tape extends, in a tensioned state, in a longitudinal direction;
   a mounting block disposed at each end of the scale tape, the scale tape being attached to each of the mounting blocks; and
   an adjuster configured to position at least a first one of the mounting blocks on the hollow section member in a first installed condition such that the first one of the mounting blocks is displaceable in the longitudinal direction, the adjuster being movably mounted on the hollow section member and capable of being brought from a first position to a second position, the first one of the mounting blocks being in the first installed condition in a state in which the adjuster is in the first position, the first one of the mounting blocks being movable to a second installed condition by moving the adjuster to the second position, wherein, in the second installed condition, the first one of the mounting blocks is fixed in a nominal position defined by the adjuster on the hollow section member.

2. The length-measuring device as recited in claim 1, wherein the adjuster is a body which is rotatably mounted in the hollow section member and has a surface configured such that the first one of the mounting blocks is positioned in the first installed condition in a state in which the body is in a first rotational position and such that, in a second rotational position of the body, the first one of the mounting blocks is positioned in the second installed condition by a surface of the body fixing the mounting block in the nominal position.

3. The length-measuring device as recited in claim 2, wherein the rotatable body has an eccentric surface with which the first one of the mounting blocks is movable from the first installed condition to the second installed condition by turning the body.

4. The length-measuring device as recited in claim 1, wherein the adjuster is a lever that is pivotable in the hollow section member, and wherein by pivoting the lever, an abutment of the lever is movable into contact with an abutment of the first one of the mounting blocks and the first one of the mounting blocks is moveable to the second installed condition.

5. The length-measuring device as recited in claim 1, wherein the adjuster is an element which is displaceable within the hollow section member and formed with a ramp that is configured such that the first one of the mounting blocks is positioned in the first installed condition in a state in which the element is in a first position and that, in a second position of the element, the first one of the mounting blocks is positioned in the second installed condition by being movable to the second installed position by the ramp.

6. The length-measuring device as recited in claim 1, wherein a resulting force application point of the scale tape on the first one of the mounting blocks and a contact point at which the adjuster contacts the first one of the mounting blocks in the second installed condition lie in a plane oriented in the longitudinal direction.

7. The length-measuring device as recited in claim 1, wherein the first one of the mounting blocks has guide surfaces which engage in undercuts of the hollow section member such that the first one of the mounting blocks in the hollow section member in such a manner that the first one of the mounting blocks is displaceable in the longitudinal direction.

8. The length-measuring device as recited in claim 7, wherein the guide surfaces are formed on projections pointing in the longitudinal direction, which are spaced apart from each other in the longitudinal direction and which each engage in a respective one of the undercuts of the hollow section member.

9. The length-measuring device as recited in claim 7, wherein a resulting force application point of the scale tape on the first one of the mounting blocks and a contact point at which the adjuster contacts the first one of the mounting blocks in the second installed condition lie in a plane oriented in the longitudinal direction, and wherein centroids of the guide surfaces lie in the plane.

10. The length-measuring device as recited in claim 7, wherein an elastic seal is disposed between the hollow section member and the first one of the mounting blocks, the elastic seal sealing an aperture of the hollow section member through which a pulling dog of the first one of the mounting blocks projects, the scale tape being attached to the pulling dog, and wherein the elastic seal surrounds the aperture and exerts a force on the mounting block, the force urging the guide surfaces against mating surfaces of the undercuts.

* * * * *